Figure 4:
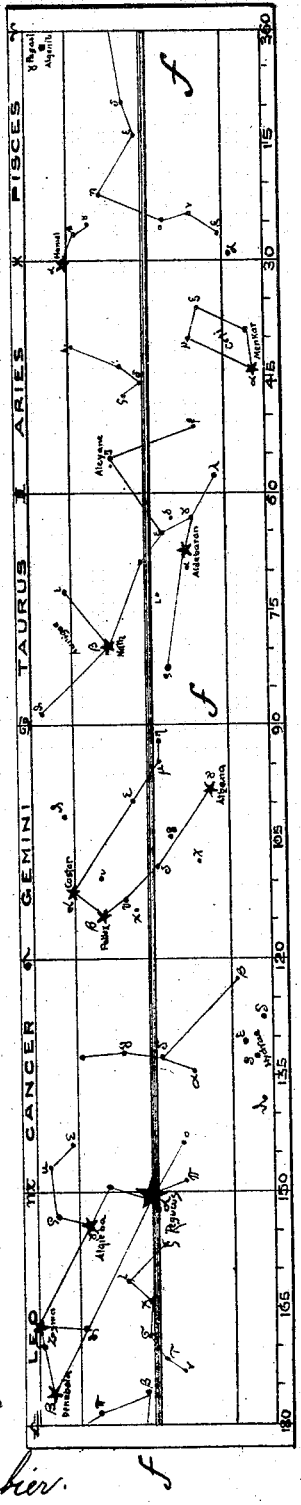

No. 858,977. PATENTED JULY 2, 1907.
H. A. HACKELING.
PLANETARIUM.
APPLICATION FILED JULY 28, 1906.
4 SHEETS—SHEET 1.
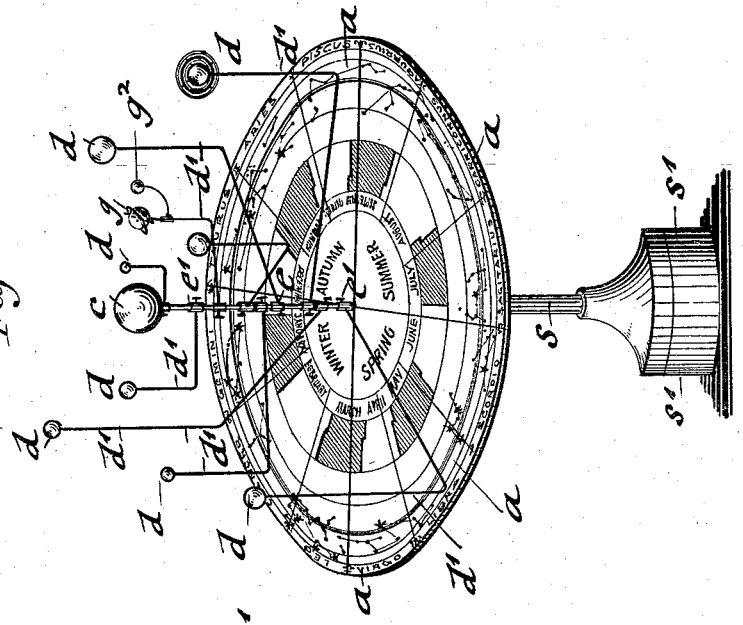
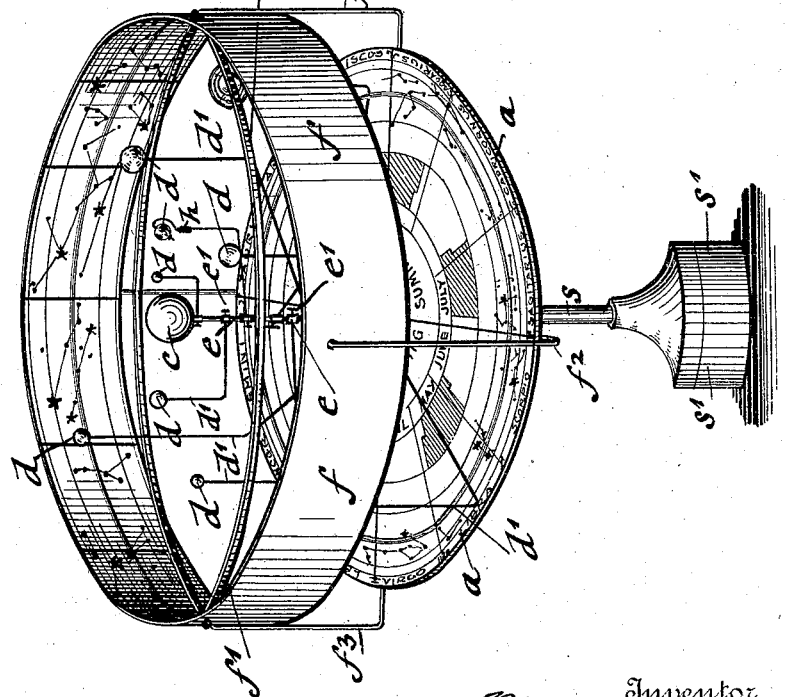

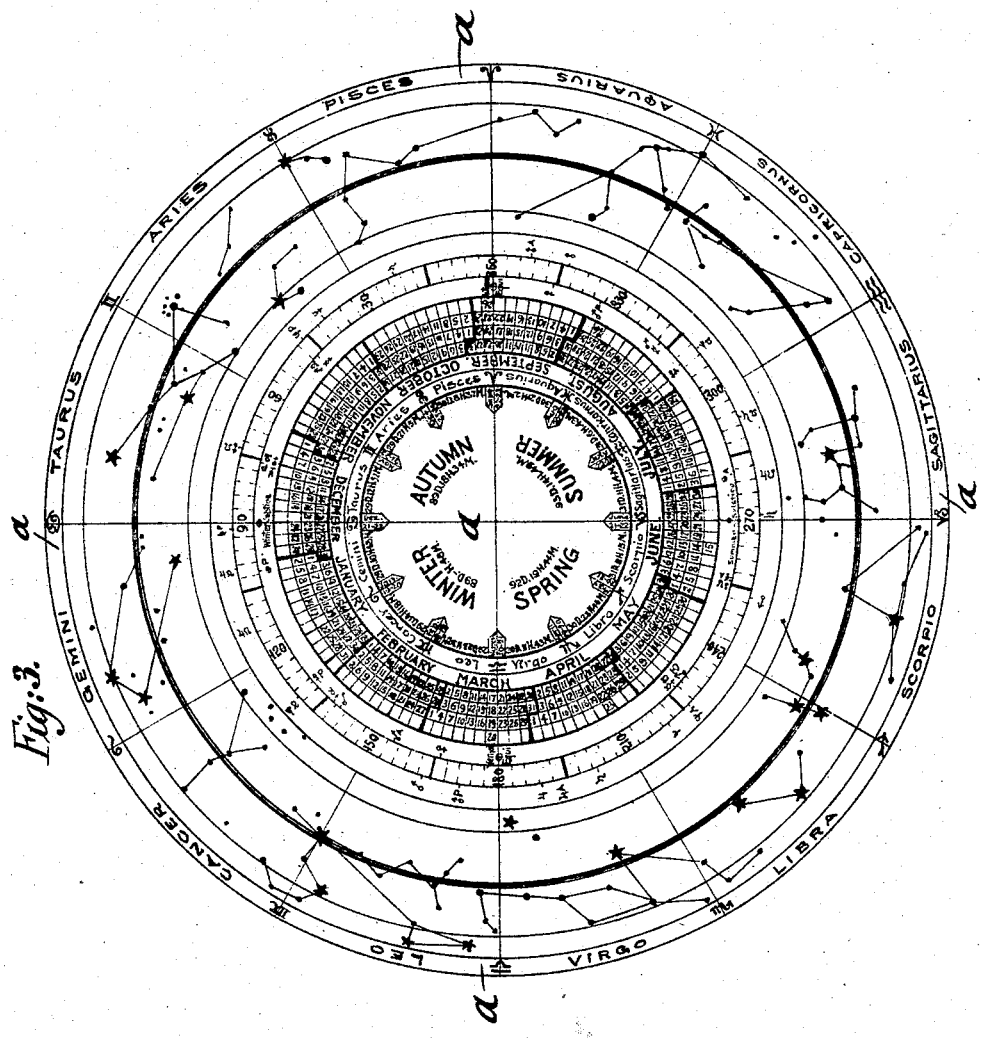

No. 858,977. PATENTED JULY 2, 1907.
H. A. HACKELING.
PLANETARIUM.
APPLICATION FILED JULY 28, 1906.

4 SHEETS—SHEET 3.

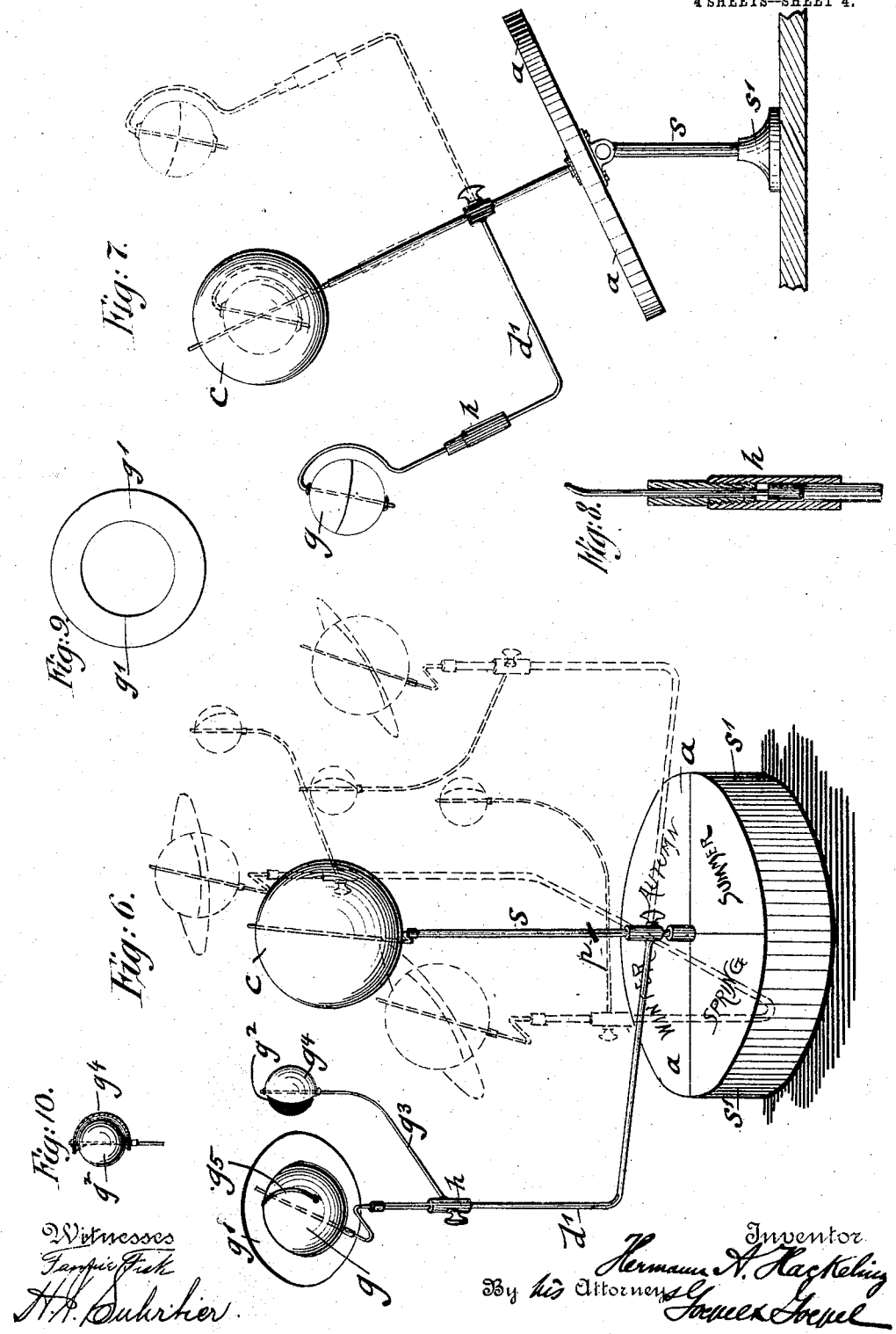

UNITED STATES PATENT OFFICE.

HERMANN A. HACKELING, OF NEW YORK, N. Y.

PLANETARIUM.

No. 858,977.　　　　Specification of Letters Patent.　　　　Patented July 2, 1907.

Application filed July 28, 1906. Serial No. 328,156.

*To all whom it may concern:*

Be it known that I, HERMANN A. HACKELING, a citizen of the United States, residing in New York, in the borough of Manhattan, county and State of New York, have invented certain new and useful Improvements in Planetariums, of which the following is a specification.

This invention relates to an improved planetarium by which the motions of the planets around the sun, their relations to each other, as well as the motions of the earth and moon, can be illustrated in all their different phases.

The planetariums heretofore constructed were complicated and expensive, and they were on that account only within the reach of the higher institutions of science and learning.

The object of this invention is to furnish a planetarium which can be supplied at a comparatively small cost, and by which, on a small scale, the motions of the planets around the sun within the starry belt of the celestial field known as the zodiac, the various positions of the planets relatively to each other, to the constellations of the zodiac, the ecliptic, the sun and earth are illustrated, in addition to the inclination of the planetary orbits towards the ecliptic, the effects resulting from the axial inclination of the planets towards their respective orbits are explained, and by means of specially prepared tables the planets can be arranged in their proper positions for any date of the year according to their true longitude and latitude on the ecliptic, so that their configurations (conjunction, opposition, quadrature, greatest elongation east and west, transits, occultations, morning and evening star) at any date in the year may be brought into direct view and their apparent motions (directly advancing, stationary and retrograde) be clearly explained.

In addition to the motions and positions of the planets relatively to the ecliptic, sun and earth, the changing conditions on the earth's surface resulting from the earth's axial inclination towards its orbit and its changing position towards the sun are illustrated, while a terrestrial globe in connection with the moon will illustrate the phenomena conditioned by the relative position of these two bodies towards the sun, while the changing relations of heavenly bodies on the celestial sphere in reference to the horizon of any place on the earth's surface are illustrated by a horizon-ring arranged on and movable around said terrestrial globe.

For this purpose the invention consists of a planetarium which comprises an upright standard representing the axis of the ecliptic, a base-disk supported stationary on the standard, a number of planets supported by angular arms on the upright standard in such a manner as to be rotated around the same or secured in fixed position thereon by suitable clamps, and a combined zodiac-belt and equinoctial-ring supported by upright angular arms on the base-disk and surrounding the planets supported on the standard.

The invention consists further of a terrestrial globe, with the moon supported on a curved arm, and a horizon-ring on said globe, movable around the terrestrial globe and adapted to illustrate the changing relations of the earth relatively to the heavenly bodies with reference to the horizon of any place on the earth's surface.

The invention consists further of a terrestrial globe, with the moon supported on a curved arm and provided with a hemispherical cap or shell of shining color covering the illuminated hemisphere of the moon's dark body and movable around the moon's axis, so that according to the moon's position, with respect to sun and earth, the proper part of the illuminated hemisphere can be turned toward the earth to illustrate the moon's phases.

The invention consists further of additional details in the construction of the base-disk with the surrounding representation of the zodiac and ecliptic, and other details, as will be fully described hereinafter and finally pointed out in the claims.

Figure 5:
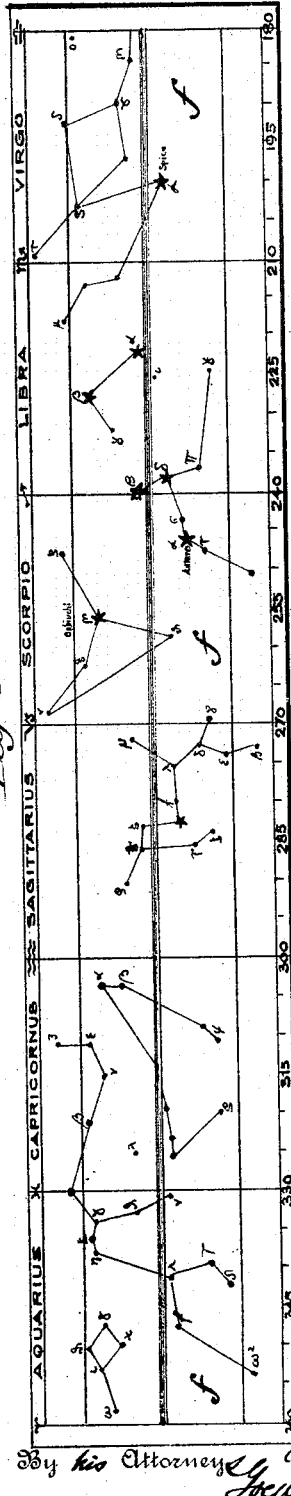

In the accompanying drawings, Figure 1 represents a perspective view of my improved planetarium, showing the base-disk and the zodiac-belt with the ecliptic and the equinoctial-ring supported on an upright center-standard, and the sun and planets arranged within said zodiac-belt and equinoctial ring, Fig. 2 is a perspective view of the planetarium, showing the base-disk, sun and planets as supported on the center-standard, but with the zodiac-belt and equinoctial ring removed, Fig. 3 is a plan-view of the base-disk drawn on an enlarged scale, Figs. 4 and 5 are detail elevations of one-half each of the zodiac-belt and ecliptic-ring, with the ecliptic developed into a plane, Fig. 6 is a detail of a terrestrial globe, with a horizon-ring, and the moon with its shell, Fig. 7 is a modified construction of the terrestrial globe, and Figs. 8, 9 and 10 are different details of construction.

Similar letters of reference indicate corresponding parts in the several figures of the drawings.

In the drawings $a$ represents the base-disk, which is supported centrally in stationary position on an upright standard $s$ provided with an enlarged and weighted base $s^1$. On the base-disk are represented, in concentric rings, first, a terrestrial season-dial; second, a calendar-dial; third, an ecliptic longitude-dial; and, fourth, a zodiacal dial. On the upper end of the upright standard $s$, representing the axis of the ecliptic, is supported a large sphere $c$ which represents the sun, while a number of planets $d$ are supported on angular arms $d^1$, the arms being of such size and height as to locate the planets at their respective distance centrally from the sun, and made smaller and larger, according to their size, the terrestrial planets being made, on account of their smallness as compared with the major planets, in the proportion of 6 to 1. The angular arms are connected by means of sleeves $e$ to the upright standard $s$, so as to be readily rotated and lengthwise movable thereon and capable of being clamped into fixed position by clamping thumb-screws $e^1$. A zodiac-belt $f$ and equinoctial-circle $f^1$ are supported on angular arms $f^2$, $f^3$, which are attached to the base-disk $a$, and surround the planets, the constellations of the zodiac being arranged on the inner surface of the belt $f$.

*The base-disk.*—The base-disk is made of a plain circular disk of any suitable material, such as pasteboard, wood, or metal, and printed in appropriate colors. It serves a double purpose: first, as a support for the whole structure and, secondly, for representing on its face-side all the points of the planetary orbits which have relation to the plane of the ecliptic. The base-disk is divided into four concentric divisions, called "dials." The central division or terrestrial season-dial illustrates the relations pertaining to the earth's yearly revolution. It illustrates the four seasons of the year, their beginning and duration, and shows on its border the corresponding seasonal signs of the ecliptic with the responding constellations of the zodiac named, and it also gives the time required by the earth to pass along each of them while performing its yearly course around the sun. Concentric with the central terrestrial season-dial is arranged a calendar-dial. It exhibits, in different radial fields or panels, the months and days of the year, arranged in ten columns for each sign of the ecliptic radially to the circumference of the dial, so that the days in each column correspond to 3° of longitude of the ecliptic, which are designated on the next concentric dial, the so-called "longitude-dial." Concentric with the calendar-dial and outside and inclosing the calendar-dial, is arranged a ring representing the longitude-dial of the ecliptic. It is divided into three concentric rings of equal width. The middle ring represents the ecliptic longitude proper, the 360° being marked off in spaces of 3°, each space of 3° answering to the dates carried in the corresponding columns of the calendar-dial, so that the date in each column points out the degree of longitude at which the earth has arrived in its orbit, while the degree of longitude points to the date at which the earth will be at that degree of longitude. The column in the calendar-dial containing four dates indicates the slower motion of the earth along the ecliptic sign corresponding to the respective month, and the fourth day balances the difference in motion, except the column in March, where the fourth day is inserted to equalize the 29th day of February in a leap year. On the rings outside and inside of the middle one the longitudes of the orbital points of the planets are indicated for the year 1900, in the inner ring those for the terrestrial and in the outer ring those for the major planets. The third concentric division, the zodiacal dial, displays the zodiacal constellations, midway of which the ecliptic is traced by a specially heavy concentric line. The principal stars, from first to fifth magnitude; composing the constellations are placed most approxi-
mately to longitude and latitude on the ecliptic with their names, and those belonging to the same constellation connected by lead-lines. A number of conspicuous stars situated outside, but near the limits of the zodiac and partly reckoned to the zodiacal constellations, are also represented within a zone of 5° north and 5° south of the zodiac proper, but on a background which is distinguished in color from that given to the zodiac, or separated by specially drawn lines. The encircling border of the dial shows the Latin names of the constellations and the signs of the ecliptic. The dial is given to enable the illustration of longitude and the configuration of the planetary bodies without the special zodiacal belt.

The horizontal portions of the arms supporting the planets correspond in length to the distance from the sun, while the vertical portions of the arms, which carry the planets directly, are of such length that the planet when in one of its nodes is in line with the plane passing through the ecliptic on the zodiac-ring and the center of the sun. Between the sleeves on which the arms are supported on the upright standard $s$ proper space is left, so as to impart to the planets an ascending and descending motion, according to their ascending and descending direction of motion in their orbits with respect to the ecliptic. The spaces allotted to each planet are separated by small rivets or pins $p$ running at right angles through the standard, the common axis. All the planets are indicated by means of spheres, with the exception of Saturn, which is represented in connection with its ring-system.

*The zodiacal belt.*—The zodiacal belt surrounds the planets at the proper height and has at its center on its inner surface, drawn by a special heavy line, the ecliptic projected. The belt is large enough to permit all the planets to display their motions within. The ecliptic divides the zodiac into two equal parts, one-half extending north and the other south of it, each generally considered to be 8—10° in breadth. In circumference the zodiac is divided into twelve equal parts, each one 30° in length, within which groups of stars are situated, called constellations of the zodiac. The principal stars, from first to fifth magnitude, which compose these constellations are placed most approximately at their distance from the ecliptic termed "latitude" north and south and according to their longitude. All are given their names, and those belonging to the same constellation are connected by lead-lines. The encircling northern border of the zodiacal belt shows the Latin names of the constellations and signs of the ecliptic, while on the southern border the degrees of longitude of the ecliptic are laid off.

*The equinoctial or celestial equator.*—The equinoctial is represented by a narrow ring joined movably at the equinoctial points of the ecliptic to the zodiacal belt. It is divided in circumference into twenty-four equal parts representing the twenty-four hour-circles and serves to explain, first, the obliquity of the ecliptic—the inclination of the plane of the equinoctial to the plane of the ecliptic—23½°; second, the precession of the equinoxes; and, third, the right ascension and declination.

An extra terrestrial globe $g$, representing the earth, is combined with a horizon-ring $g^1$ and a moon $g^2$. The terrestrial globe is made larger than the size used among the planets in general and is furnished for the purpose of illustrating the effects produced by the earth's revolution around the sun, its rotation on its axis, the inclined position of its axis towards its orbit, and the parallelism of the axis to itself. The phenomena which are conditioned by these relations are: the change of seasons, variations in the lengths of the days and nights, varying distribution of light and heat to variant places on the earth's surface, and the continuous change of the aspect of the heavens. The globe is connected to its arm in the same manner as the planets, which latter, in order to give room for better display, are preferably removed before the extra terrestrial globe is adjusted on the upright standard $s$. The moon $g^2$ is supported on a curved arm $g^3$ having a sleeve on its inner end for permitting a circular and up and down motion on the arm supporting the earth, first, for illustrating the moon's revolution around the earth, and, second, for showing the inclination of its orbit towards the ecliptic. The moon $g^2$ is provided with a hemispherical cap or shell $g^4$ of celluloid or other material and of a shining color, so as to cover her illuminated hemisphere and move around her axis, so that, according to the moon's position with respect to sun and earth, the proper part of her illuminated half can be turned towards the earth to illustrate the moon's phases. By this combination of earth and moon, the different phases of the moon and eclipses of sun and moon can be readily demonstrated. The horizon-ring is represented by a flat ring, the inner edge of which encircles the terrestrial globe, while the surfaces of the horizon-ring show the azimuth divided into degrees. The horizon-ring is connected with the terrestrial globe by means of two spring-clasps $g^5$, the one running at right angles from the north point of the horizon 90° southward on one side, and the other running at right angles from the south point of the horizon-ring 90° northward to the middle of the globe, as shown in Fig. 6. Both clasps or arms serve at the same time as indicators for the meridian, their end-points indicating the zenith and nadir of the places for which the horizon-ring is adjusted. As the ring can be moved easily over the surface of the globe, it can be adjusted to the horizon of any place on the same. The horizon-ring serves for the purpose of demonstrating the causes and effects of the daily changes of the sun's diurnal arc, its change of azimuth in rising and setting and of altitude in culminating, of explaining the difference between sidereal and solar time, of illustrating the cause of the moon's daily later rising and setting, the difference of her sidereal and synodic revolution, the causes producing periodically high and low moons and of showing the continuous change of the celestial, especially the zodiacal, aspect in consequence of the earth's rotating and revolving motion, producing the apparent diurnal revolution of the celestial sphere around the earth from east to west. The different relative positions of the terrestrial globe relatively to the sun and moon are shown in dotted lines in Fig. 6, while in Fig. 7 a special arrangement of the terrestrial globe is shown in which the base-disk is placed at an angle of inclination to the horizontal frame, so that the sun-supporting standard is also placed out of the vertical line and the earth is supported at the upper end of the curved arm, the lower end of which is guided freely in a sleeve $h$ of the moon-supporting arm, so that when the terrestrial globe is moved around the sun it will assume the different positions by gravity owing to the axial motion imparted to its movable supporting-arm. The detail of the horizon-ring as detached from the terrestrial globe is shown in Fig. 9.

Planets and terrestrial globe, combined with the moon, being properly adjusted to the planetarium, the true and apparent motions of the planets and the sun, the changing position of the earth's axis in its orbit towards the sun and the motion of the moon, with her phases, around the earth as well as the different relations of the planets as seen from the sun (heliocentric) and as seen from the earth (geocentric) may be explained by the teacher or followed by the student in connection with the book of instructions which is furnished with the planetarium. The orbital points with respect to the earth, as perihelion, aphelion, vernal and autumnal equinox and winter and summer solstice, and with regard to the other planets, as perihelion and aphelion, ascending and descending node and greatest heliocentric latitude north and south, can be explained and illustrated. Most approximately true longitudes of the planets for any day of the year can be ascertained by their orbital points by means of the mean daily motion of the planets within their orbital sections as limited by two successive orbital points, as shown in the tables furnished especially for that purpose, and which also state the amount of change in longitude of the orbital points during one sidereal revolution of the planets, so as to determine the degree of longitude of the orbital points and time when reached in the successive revolutions, so that the student can obtain an accurate demonstration and clear conception of the true and apparent motions and configurations of the planets.

Having thus described my invention, I claim as new and desire to secure by Letters Patent:

1. A planetarium comprising an upright standard, a stationary base-disk divided into concentric circles or dials, a spherical body representing the sun supported at the upper end of the standard, spheres representing the planets arms connected with said standard and supporting said spheres, a zodiac-belt surrounding said planetary bodies, and upright arms attached to the base-disk and to the zodiac-belt for supporting the latter.

2. A planetarium comprising an upright standard, a stationary base-disk supported on said standard and containing concentric circles or dials for the seasons, calendar, ecliptic longitude and zodiac, a sphere representing the sun carried at the upper end of the standard, a plurality of spheres representing the planets, angular arms connected with the standard and supporting said planets, means for clamping or releasing said planet-carrying arms, a zodiac-belt and an equinoxial-ring, and upright arms for supporting said rings on the base-disk.

3. In a planetarium, the combination, with an upright standard and a base-disk supported thereon, of a terrestrial globe, an angular supporting-arm connected with said standard and supporting the globe, a sphere representing the sun located at the upper end of said standard, a sphere representing the moon, a curved arm applied to the globe-supporting arm and supporting said sphere, a horizon-ring encircling the terrestrial globe, and spring-clasps for holding said horizon-ring on the terrestrial globe.

4. In a planetarium, the combination, with an upright standard and a base-disk supported thereon, of a spherical body representing the sun at the upper end of the standard, a terrestrial globe, an arm connecting said globe with said standard, a sphere representing the moon, a curved arm applied to the globe-supporting arm and supporting said sphere, a horizon-ring encircling said sphere spring-clasps applied to the terrestrial globe, and a hemispherical shell pivoted to the axis of the moon and adapted to be turned on the same.

In testimony, that I claim the foregoing as my invention, I have signed my name in presence of two subscribing witnesses.

HERMANN A. HACKELING.

Witnesses:
PAUL GOEPEL,
HENRY J. SUHRBIER.